(12) United States Patent
Bassani

(10) Patent No.: US 7,426,980 B2
(45) Date of Patent: Sep. 23, 2008

(54) INTERNAL COMBUSTION ENGINE EXHAUST SYSTEM

(75) Inventor: Darryl C. Bassani, 5729 Grandview, Yorba Linda, CA (US) 92886

(73) Assignee: Darryl C. Bassani, Anaheim, CA (US)

( * ) Notice: Subject to any disclaimer, the term of this patent is extended or adjusted under 35 U.S.C. 154(b) by 0 days.

(21) Appl. No.: 10/919,624

(22) Filed: Aug. 17, 2004

(65) Prior Publication Data

US 2005/0011698 A1 Jan. 20, 2005

Related U.S. Application Data

(63) Continuation of application No. 10/151,699, filed on May 16, 2002, now Pat. No. 6,889,499.

(60) Provisional application No. 60/291,585, filed on May 16, 2001.

(51) Int. Cl.
*F01N 7/06* (2006.01)
*F01N 1/02* (2006.01)
*F02B 27/02* (2006.01)
*F01N 1/08* (2006.01)
*F01N 7/10* (2006.01)

(52) U.S. Cl. ............ 181/238; 181/251; 181/269; 181/275; 181/255; 60/313; 60/322; 60/323; 60/324

(58) Field of Classification Search ............ 181/238, 181/239, 240, 251, 252, 256, 257, 269, 272, 181/275, 281, 282, 255
See application file for complete search history.

(56) References Cited

U.S. PATENT DOCUMENTS

| | | | |
|---|---|---|---|
| D182,135 S | 2/1958 | Maynard et al. | |
| 3,072,214 A | * 1/1963 | Deremer | 181/250 |
| D214,037 S | 5/1969 | Flugger | |
| 3,642,093 A | * 2/1972 | Schach | 181/239 |
| 3,957,133 A | * 5/1976 | Johnson | 181/256 |
| 4,108,276 A | * 8/1978 | Hall et al. | 181/256 |
| D255,112 S | 5/1980 | Alexander | |
| 4,220,219 A | 9/1980 | Flugger | |
| 4,252,212 A | * 2/1981 | Meier | 181/248 |
| 4,342,195 A | 8/1982 | Lo | |
| 4,359,865 A | 11/1982 | Nakao et al. | |
| 4,574,914 A | 3/1986 | Flugger | |
| 4,621,494 A | 11/1986 | Fujita | |
| 4,712,644 A | * 12/1987 | Sun | 181/251 |
| 4,800,719 A | * 1/1989 | Campbell | 60/313 |
| 4,831,823 A | 5/1989 | Ueda | |
| 4,860,538 A | 8/1989 | Takeuchi | |
| 4,926,634 A | 5/1990 | Putz et al. | |
| 4,947,645 A | 8/1990 | Pemberton | |
| 5,144,799 A | 9/1992 | Barth | |

(Continued)

Primary Examiner—Edgardo San Martin

(57) ABSTRACT

An exhaust system for an internal combustion engine having two banks of cylinders by which pulses of exhaust gas are alternately directed to a diverter subassembly. The diverter subassembly, which is located in the muffler, includes a perforated gas decelerator chamber which divides each pulse of exhaust gas between two exhaust outlets and causes a low pressure wave to occur in the exhaust system to enhance scavenging of a subsequent pulse of exhaust gas and thereby improve engine performance and mileage. The muffler further includes one or more cores and may or may not include a dead air space chamber to provide attenuation and tonal balance to the exiting exhaust gas.

21 Claims, 11 Drawing Sheets

U.S. PATENT DOCUMENTS

| | | |
|---|---|---|
| 5,148,597 A | 9/1992 | Weeks |
| 5,183,976 A * | 2/1993 | Plemons, Jr. ................ 181/264 |
| 5,187,334 A | 2/1993 | Abbott et al. |
| 5,214,253 A * | 5/1993 | Houston, Jr. ................ 181/238 |
| 5,216,883 A * | 6/1993 | Flugger ........................ 60/313 |
| 5,248,859 A * | 9/1993 | Borla ........................ 181/238 |
| 5,351,481 A * | 10/1994 | Flugger ........................ 60/273 |
| 5,519,994 A | 5/1996 | Hill |
| 5,594,217 A * | 1/1997 | LeQuire .................... 181/235 |
| 5,659,158 A | 8/1997 | Browning et al. |
| 5,740,671 A * | 4/1998 | Jones ........................ 60/323 |
| 5,773,770 A * | 6/1998 | Jones ........................ 181/268 |
| 5,782,088 A * | 7/1998 | Gunther et al. ............... 60/278 |
| D406,593 S | 3/1999 | Bittle |
| 5,936,210 A | 8/1999 | Borneby et al. |
| 5,959,263 A | 9/1999 | Foltz, Jr. |
| 6,302,235 B1 * | 10/2001 | Matherne .................... 181/268 |
| 6,382,347 B1 * | 5/2002 | Gerber ....................... 181/227 |
| 6,382,348 B1 * | 5/2002 | Chen ......................... 181/239 |
| 6,382,349 B2 * | 5/2002 | Matherne .................... 181/239 |
| 6,470,998 B1 * | 10/2002 | White ........................ 181/243 |
| 6,510,921 B2 * | 1/2003 | Price ......................... 181/264 |
| 6,520,286 B1 | 2/2003 | Frederiksen et al. |
| 6,679,351 B2 * | 1/2004 | Cummings et al. .......... 181/212 |
| 6,868,939 B2 * | 3/2005 | Ziehl ......................... 181/256 |

* cited by examiner

INTERNAL COMBUSTION ENGINE EXHAUST SYSTEM

RELATED APPLICATIONS

This application is a continuation of U.S. patent application Ser. No. 10/151,699, filed May 16, 2002, now U.S. Pat. No. 6,889,499, and titled "Internal Combustion Engine Exhaust System," which itself claims priority to U.S. provisional patent application Ser. No. 60/291,585, filed May 16, 2001, titled "Internal Combustion Engine Exhaust System," which is hereby incorporated by reference.

BACKGROUND OF THE INVENTION

1. Field of the Invention

This invention relates generally to exhaust systems. More particularly, the invention relates to an exhaust muffler for a multi-cylinder internal combustion engine.

2. Description of the Related Art

Generally, vehicle manufacturers design exhaust systems to comply with sound attenuation and emission requirements. However, performance engines used in vehicles such as sports cars are often designed to maximize power output. The maximum power output often occurs at higher engine speeds. At these high speeds, exhaust system backpressure can limit the operational envelope of the performance engine. A significant source of the backpressure in the conventional exhaust system is a muffler.

The muffler design further changes the exhaust sound by way of restriction, absorption, or reflection methods alone, or with their combination. As the exhaust gas is passed through the muffler, the sound wave energy associated with the exhaust gas is converted into heat and is dissipated. The muffler accomplishes this task with the use of metal plates, tubes, insulation, and/or chambers with a series of holes or perforations along with one of the three methods mentioned above. Typical OEM designs use restriction type mufflers which force the exhaust gas through a long arduous path, often including a chamber and/or reversing the direction of the gas flow. Restriction muffler designs maximize their sound deadening ability at the significant cost of reducing engine performance and fuel economy.

An example of an absorption method is a muffler design that sends the exhaust gases through a chamber by way of at least one straight through pipe that is perforated and wrapped with insulating material, for example, steel wool or fiberglass. The selection of chamber size and whether the design will incorporate baffles will dictate the advantages and disadvantages presented by the selected design. For example, if a chamber is selected with a diameter slightly greater than the through pipe, the sound attenuation will be minimal; however, minimal back pressure will be introduced into the exhaust system. In designs that use a much larger chamber than the straight through pipe, the sound attenuation will be increased, however, an increase in back pressure will be incurred. With this design, as the exhaust gasses enter the large chamber, they expand and slow down dramatically whereby they dwell longer in the insulating insulation, and thus absorb more noise. The larger chamber gently tapers back into the smaller size of the exhaust pipe. Reflective mufflers utilize absorption principles in conjunction with reflection to minimize noise by colliding out of phase sound waves to cancel each other.

SUMMARY OF THE INVENTION

The systems and methods of the present invention have several features, no single one of which is solely responsible for its desirable attributes. Without limiting the scope of this invention as expressed by the claims that follow, its more prominent features will now be discussed briefly. After considering this discussion, and particularly after reading the section entitled "Detailed Description of the Preferred Embodiments" one will understand how the features of this invention provide several advantages over traditional scheduling methods and systems.

One aspect is a muffler for receiving alternating pulses of exhaust gas from a multi-cylinder engine. The muffler comprises a housing and a gas decelerator chamber located substantially within the housing. The gas decelerator chamber aligns alternating pulses of exhaust gas onto a flow splitter, wherein the flow splitter divides the alternating pulses of exhaust gas between a first exhaust outlet and a second exhaust outlet, and wherein the two exhaust outlets direct the divided pulse of exhaust gas away from the flow splitter. In an embodiment, the muffler further includes cores located substantially within the housing and connected to and in flow communication with the exhaust outlets, wherein the cores swirl the divided pulse of exhaust gas.

Another aspect is an exhaust system of a multi-cylinder engine that comprises a plurality of exhaust ports which are split between a first group and a second group, wherein the first group and the second group each discharge a pulse of exhaust gas from the engine and a muffler. The muffler comprises a housing, a diverter subassembly located substantially in the housing and comprising a perforated gas decelerator chamber, wherein the diverter subassembly aligns the pulse of exhaust gas from the first group and the second group onto a flow splitter in the perforated gas decelerator chamber, wherein the flow splitter is located obliquely to the direction of exhaust gas flow so as to distribute the pulse of exhaust gas between a first exhaust outlet and a second exhaust outlet. In an embodiment, the muffler further includes a plurality of cores located substantially in the housing and connected to and in flow communication with the first and second exhaust outlets, wherein each core comprises perforations configured to swirl the distributed pulse of exhaust gas as it travels through each core.

Another aspect is a method for processing exhaust gases from a multi-cylinder engine, wherein a pulse of exhaust gas is produced in a cylinder of the multi-cylinder engine and processed by a muffler. The method comprises routing the pulse of exhaust gas in a flow path from the cylinder to one of two exhaust inlets of the muffler, wherein the two exhaust inlets alternate in their collection of subsequent discharges of the pulse of exhaust gas, dividing a portion of the pulse of exhaust gas into two portions of exhaust gas with a perforated flow splitter, and expelling both portions of exhaust gas from the muffler and into the atmosphere.

Still another aspect is a resonator configured to connect with an original equipment manufacturer (OEM) exhaust system and thereby attenuate exhaust noise. The resonator comprises a housing, wherein the housing connects upstream of an OEM muffler and a diverter subassembly located substantially within the housing. The diverter subassembly comprises a first inlet pipe and a second inlet pipe connected to and in flow communication with the OEM exhaust system, a gas decelerator chamber connected to and in flow communication with the first and second inlet pipes, wherein the alignment of the first and second inlet pipes directs the pulse of exhaust gas onto a flow splitter in the gas decelerator chamber, wherein the flow splitter is located obliquely to the flow direction of the pulse of exhaust gas and divides the pulse of exhaust gas, and a first outlet pipe and a second outlet pipe connected to and in flow communication with the gas decelerator chamber, wherein the two outlet pipes direct the divided pulse of exhaust gas away from the flow splitter and to the OEM muffler.

DETAILED DESCRIPTION OF THE PREFERRED EMBODIMENTS

Figure 1:
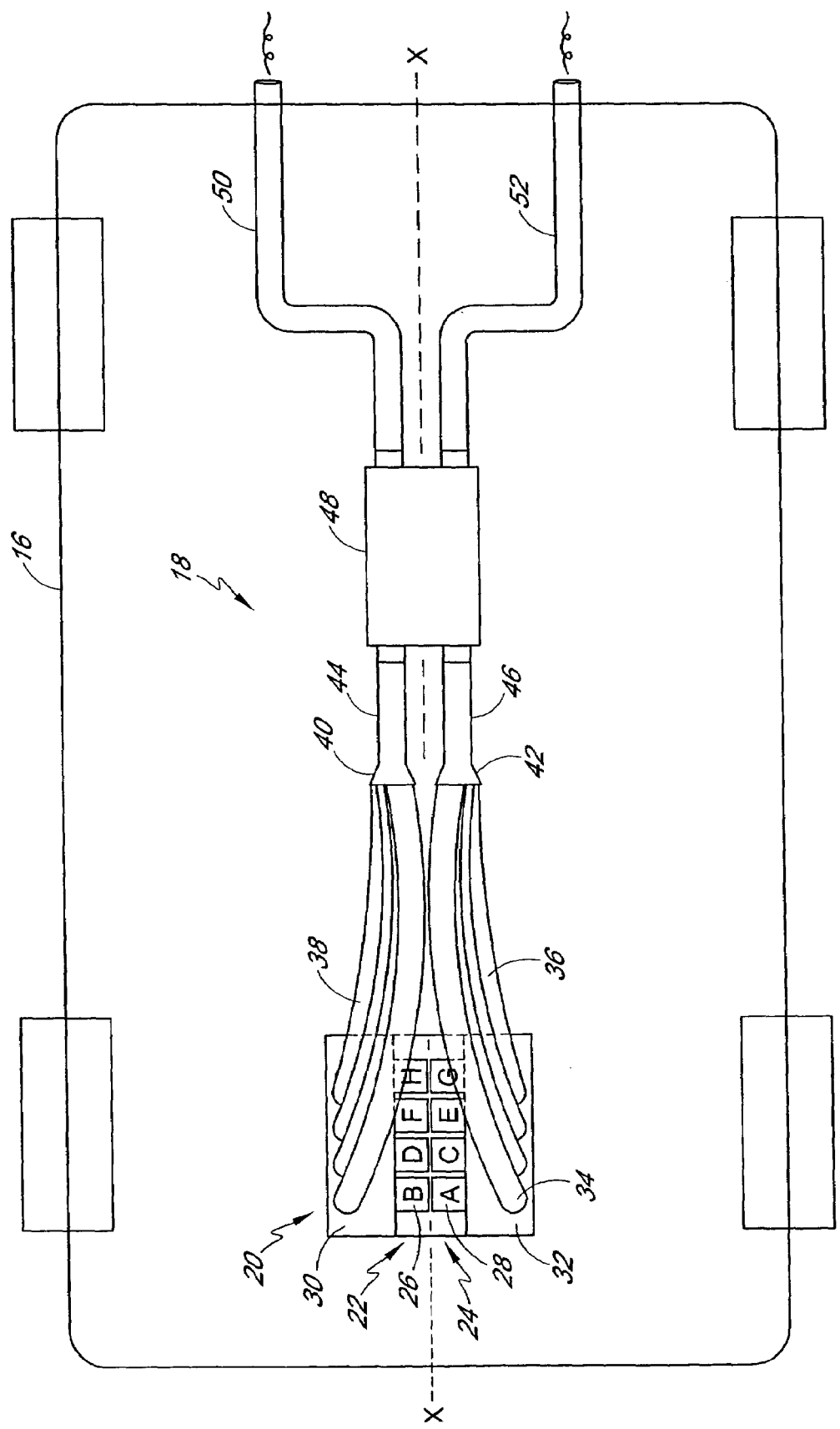
FIG. 1 is a bottom plan view showing an exhaust system according to a preferred embodiment of the invention.

Preferred embodiments of the present invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific preferred embodiments of the present invention.

Traditionally, internal combustion engines employ exhaust systems to convey the exhaust gas from the engine's cylinder to the ambient environment. The journey begins at the engine cylinder that incorporates intake and exhaust ports and valves for ingress and egress to the cylinder. Fresh air mixed with fuel enters the engine cylinder through the intake port where it is subsequently compressed by a piston and ignited. A rapid expansion of the compressed fuel and air occurs, thereby forcefully moving the piston in the opposite direction to the compression stroke. Once the expansion is complete, the exhaust valve opens to allow the combustion by-products or gas to exit the engine cylinder through the exhaust port and enter an exhaust pipe. In the case of a four-stroke design, a valve is utilized to open or close the exhaust port. The exhaust gas expelled from the engine cylinder, after passing through the exhaust port, enters an exhaust pipe.

The exhaust pipe is designed to direct the exhaust gas towards the rear of the vehicle and commonly utilizes bends and curves to accomplish this goal. The exhaust gas, after passing through the exhaust pipe, is typically fed into a muffler prior to its expulsion into the atmosphere to dissipate, or "muffle," unwanted noise originating in the combustion process. The muffler design will significantly affect the audible noise level or sound of the engine. A manufacturer can attenuate or change the sound of the engine in their selection of a muffler design so as to not only meet governmental noise requirements but also for the engine to exhibit a pleasing sound to the ear.

Depending on the design of the exhaust system, including the muffler, backpressure will occur, which impedes the free flow of exhaust gases along the exhaust system's entire length. For example, in a four-stroke engine, the piston pushes the exhaust gases out of the cylinder and into the exhaust system. If the back pressure in the exhaust system is reduced; the piston requires less force to expel the exhaust gases from the engine cylinder and thus increases the performance and efficiency of the engine. The performance of an engine is measured by the engine's generation of, for example, horsepower and torque over the entire rpm operating range. Generally, less backpressure will enhance the performance of the engine, or more specifically the engine's production of horsepower and torque will increase along with an increase in its efficiency and a corresponding decrease in the engine's fuel consumption.

Customization of exhaust components, such as mufflers, by users is common in the aftermarket. Customization allows the user to re-optimize the characteristics of their vehicle so as to maximize their own satisfaction. A successful customization leads to not only personal satisfaction of accomplishment, but also a feeling of attachment to the vehicle. Often, the replacement of a component made by the original equipment manufacturer (OEM) with an aftermarket part does not live up to expectations and will not be easily reversible once it is completed. This can lead to the user incurring additional costs to reverse the modification.

In the case of exhaust systems, incorporation of aftermarket components often requires cutting and welding of the OEM exhaust system. Exhaust pipes or other parts of the exhaust system are cut to incorporate a new muffler. Thus, the level of financial risk being taken by the user and difficulty in reversing the modification are increased. Furthermore, modifying an OEM exhaust system to improve performance is further complicated by space limitations along the undercarriage of the vehicle.

FIG. 1 is an undercarriage plan view of an automobile 16 showing an exhaust system 18 according to the preferred embodiment of the invention. An internal combustion engine 20 has two cylinder banks 22, 24 in an opposed arrangement. The two cylinder banks 22, 24 consist of a plurality of cylinders 26, 28, respectively. In the embodiment of the invention shown in FIG. 1, the two cylinder banks 22, 24 comprise four left and four right cylinders in the plurality of cylinders 26, 28. Each of the two cylinder banks 22, 24 have fixedly attached a cylinder head 30, 32 which forms a plurality of combustion chambers (not shown) within each plurality of cylinders 26, 28. Each cylinder head 30, 32 incorporates at least one of a plurality of intake ports (not shown) and at least one of a plurality of exhaust ports 34 for ingress and egress to the plurality of cylinders 26, 28. The intake ports are connected to an intake system (not shown) where fresh air mixed with fuel enters the plurality of engine cylinders 26, 28 where it is subsequently compressed by a plurality of pistons (not shown) into the plurality of combustion chambers (not shown) and ignited. A rapid expansion of the compressed fuel and air occurs, thereby forcefully moving the plurality of pistons in the opposite direction to the compression stroke.

The ignition of the compressed fuel and air occurs in an alternating sequence whereby one of the plurality of cylinders 26 transmits a pulse of exhaust gas followed by the transmission of another pulse of exhaust gas from one of the plurality of cylinders 28. In the embodiment shown in FIG. 1, this sequence depends on the engine design and continually repeats during the operation of the internal combustion engine 20. Once the rapid expansion of the compressed fuel and air is complete, one of the plurality of exhaust ports 34, which is in flow communication with the ignited engine cylinder 26, 28, opens to allow the combustion by-products or pulse of gas to exit through the cylinder head 30, 32 and into a plurality of primary exhaust pipes 36, 38.

The plurality of primary exhaust pipes 36, 38 have a plurality of inlet ends (not shown) which are connected to the plurality of exhaust ports 34 to scavenge each pulse of exhaust gas from the plurality of engine cylinders 26, 28. Each of the primary exhaust pipes 36, 38 are configured to be in flow communication with each of the cylinders 26, 28 and are brought together into one of two collector chambers 40, 42 for each of the two cylinder heads 30, 32. Each of the two collector chambers 40, 42 is connected to and in flow communication with at least one outlet end (not shown) of each plurality of primary exhaust pipes 36, 38, wherein the two collector chambers 40, 42 alternate in their collection of subsequent discharges of the pulse of exhaust gas from the internal combustion engine 20.

The combination of pulses of exhaust gas in the preferred embodiment of the present invention increases the performance of the internal combustion engine 20 by enhancing scavenging. Scavenging is the process of removing the exhaust gases from the cylinders. A properly scavenged engine will run more efficiently, using less fuel to make more power and lower emissions. In a four-stroke engine, this reduces the force required by the piston to expel the pulse of exhaust gas from the plurality of cylinders 26, 28.

In another embodiment of the invention, the collector chambers 40, 42 may take another form (not shown) in an exhaust system. For an eight-cylinder engine, this process could be an exhaust manifold combining the exhaust ports on each bank into an exhaust pipe for each bank entering into a muffler.

In still another embodiment of the invention, the plurality of cylinders 26, 28 each have their own equal length primary exhaust pipe (not shown). This means each primary exhaust pipe 36, 38 is routed between the plurality of exhaust ports 34 and the collector chambers 40, 42 such that all of the plurality of primary exhaust pipes have the same overall length. Each plurality of primary exhaust pipes feeds into one of the two collector chambers 40, 42 as opposed to manifolds as discussed above. The benefit to using equal length primary exhaust pipes is that the pulses of exhaust gas will not arrive at the same time at each of the collector chambers 40, 42, which minimizes any interference between the pulses.

Still referring to FIG. 1, in the preferred embodiment, the two collector chambers 40, 42 are further connected to the muffler assembly 48 by way of secondary exhaust pipes 44, 46. Once the exhaust gases pass through the muffler assembly 48, they will enter one or more downstream exhaust pipes 50, 52 on their way to being expelled into the environment. As illustrated in FIG. 1, the exhaust system 18 is primarily symmetrical with respect to axis X-X. However, one who is skilled in the art will appreciate that the exhaust system 18 can be designed non-symmetrically to accommodate various undercarriage design factors. These design factors may include, but are not limited to, incorporating a transverse engine, driveline configuration, axle location, spare tire location, and fuel tank location. In an alternate embodiment, the secondary exhaust pipes 44, 46 incorporate a pollution control device, for example a catalytic converter, upstream of the muffler assembly 48.

Figure 2:
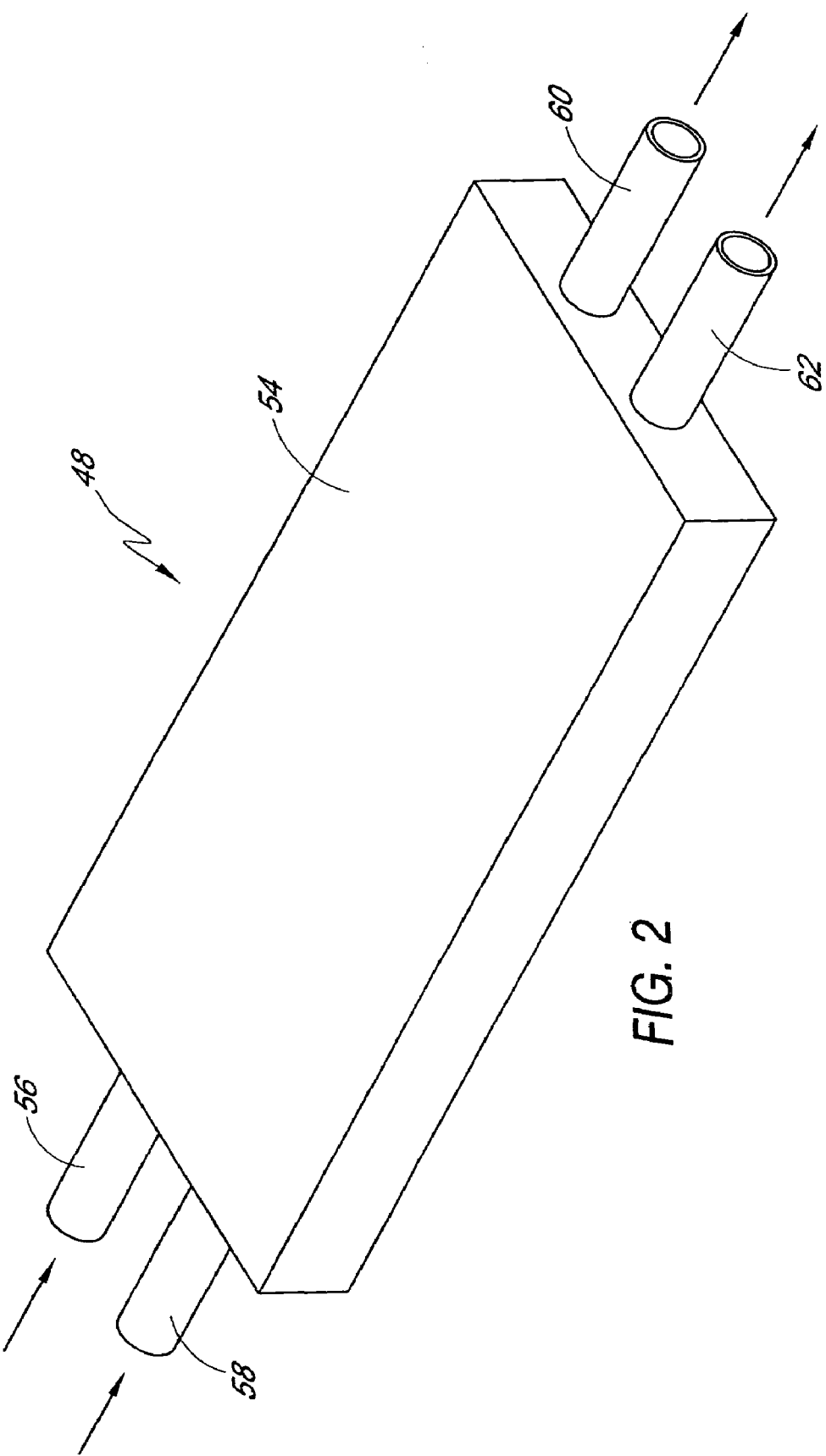
FIG. 2 is a perspective view of a muffler assembly in accordance with the preferred embodiment of the invention.

Now referring to FIG. 2, a perspective view of an external housing 54 of the muffler assembly 48 is shown. Each pulse of exhaust gas from one of the secondary exhaust pipes 44, 46 enters the external housing 54 through muffler inlets 56, 58. Thus, the muffler inlets 56, 58 form flow conduits between the secondary exhaust pipes 44, 46 and the muffler assembly 48. Likewise, muffler outlets 60, 62 provide passageways for each pulse of exhaust gas to exit the external housing 54.

In another embodiment, a single muffler outlet (not shown) provides the passageway for each pulse of gas to exit the external housing 54. In this embodiment, the single muffler outlet is centered between the illustrated locations of the muffler outlets 60, 62 in FIG. 2. Alternatively, the single muffler outlet is shifted away from the centered location. The location of the single muffler outlet can be advantageously selected for a specific application to the automobile 16. In embodiments with the single muffler outlet, one or more downstream exhaust pipes 50, 52 are attached thereto.

Figure 3:
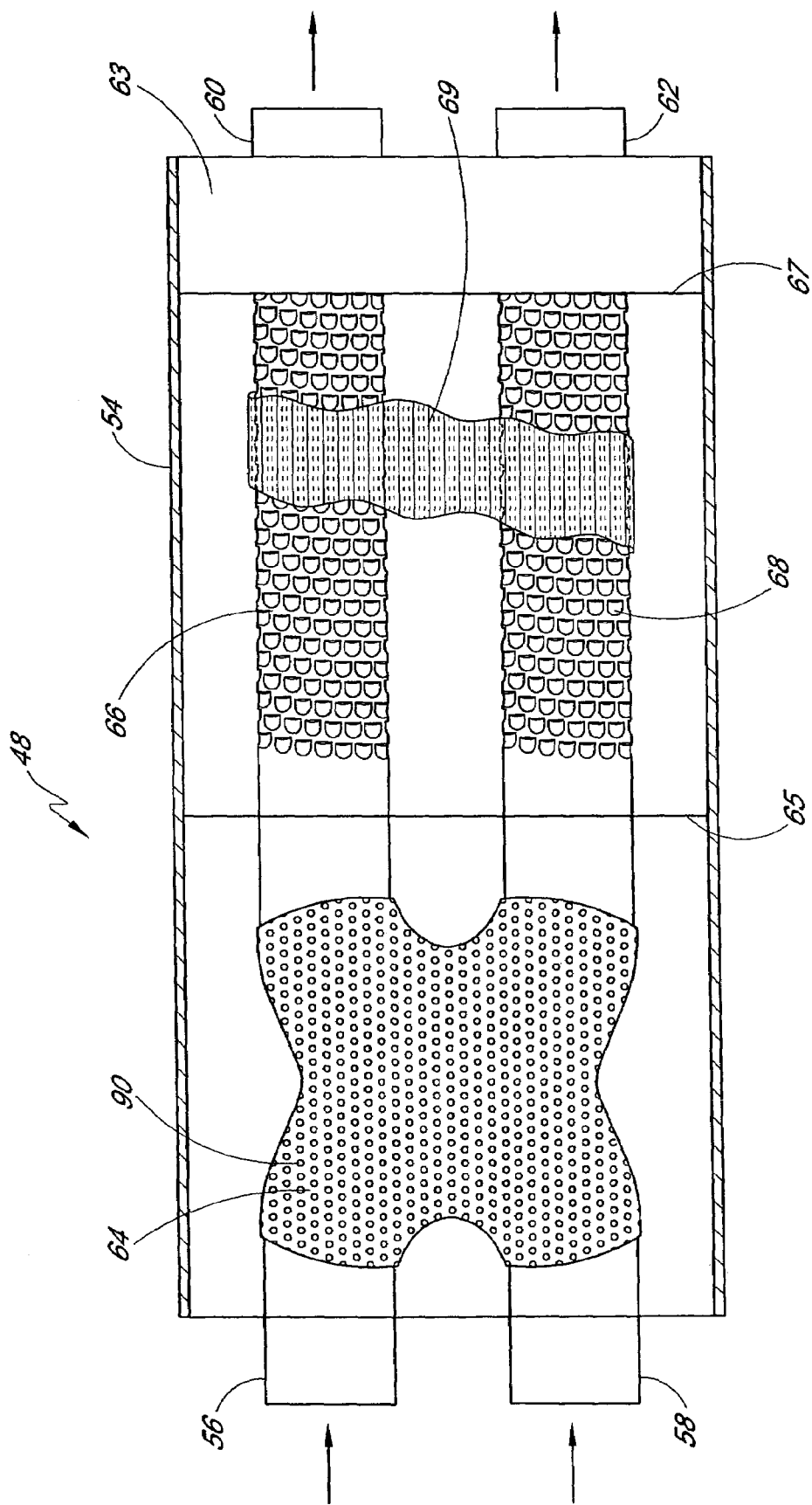
FIG. 3 is a cut-away top perspective view of the muffler assembly in accordance with the preferred embodiment of the invention.

The operation of one embodiment of the muffler assembly 48 may be understood upon reference to FIG. 3, which is a cut-away top perspective view of a muffler assembly 48 incorporating aspects of the invention. Inside the external housing 54 is a diverter subassembly 64, cores 66, 68, and a dead air space chamber 63. The diverter subassembly 64 and the plurality of exhaust cores 66, 68 are in flow communication through a first baffle plate 65. While the plurality of exhaust cores 66, 68 and the dead air space chamber 63 are in flow communication through a second baffle plate 67.

Still referring to FIG. 3, the diverter subassembly 64 receives each pulse of exhaust gas by way of one of the plurality of muffler inlets 56, 58, each connected to and in flow communication with one of the secondary exhaust pipes 44, 46. The exhaust gas flows into the diverter subassembly 64 where the pulse of exhaust gas is bisected between the cores 66, 68. While the pulse of exhaust gas passes through the diverter subassembly 64, the gas near the periphery of the pulse expands through an array of perforations 90 in the diverter subassembly 64. The pulse of exhaust gas expands through the perforations 90 dissipating a portion of the exhaust gas's sound energy into the sound-absorbing material, which may be placed between the diverter 64 and the external housing 54.

Figure 4:
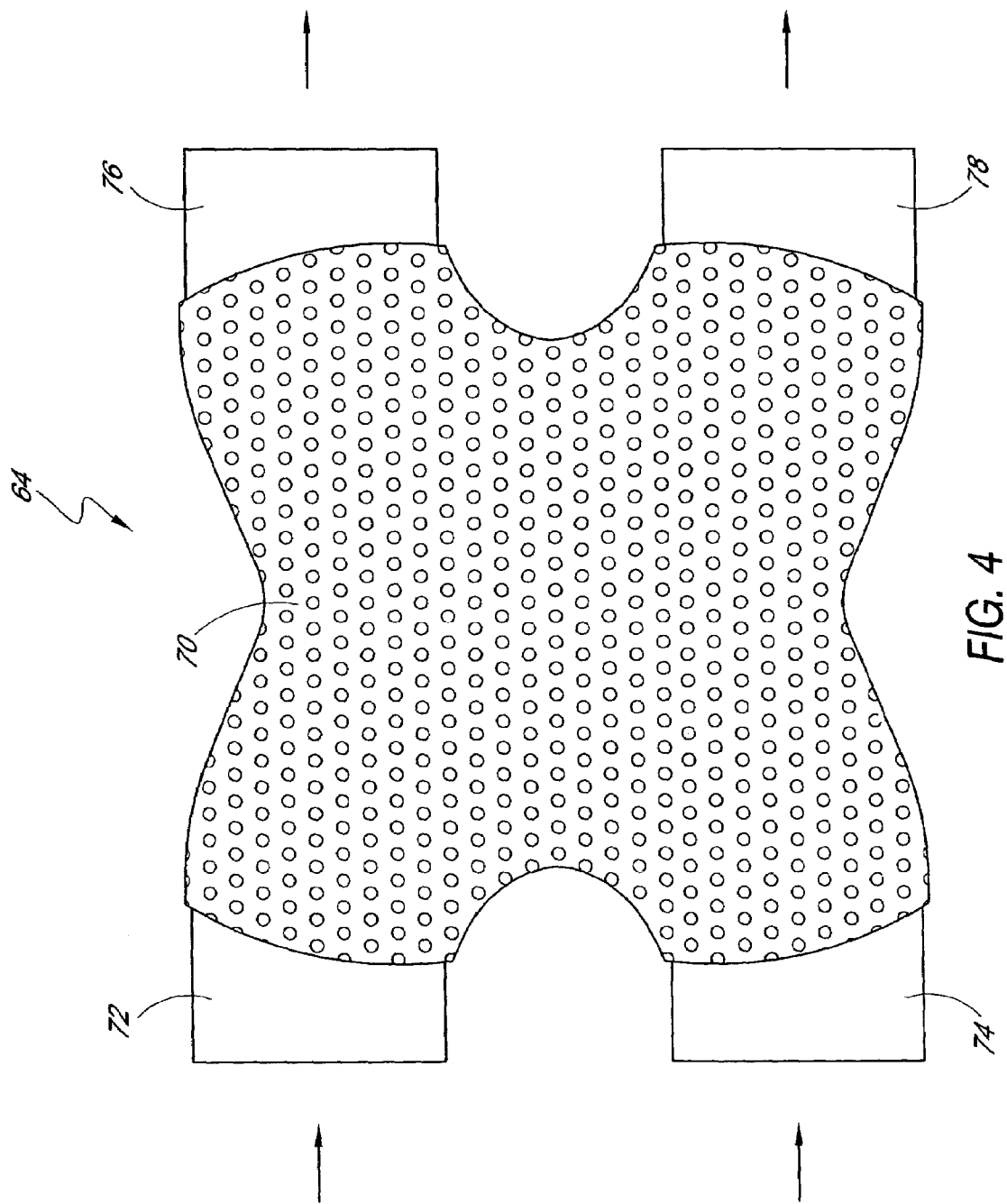
FIG. 4 is a top perspective view of a diverter subassembly that is a component of the muffler assembly shown in FIG. 3.

As shown more clearly in FIG. 4, the diverter subassembly 64 may comprise a gas decelerator chamber 70, two inlet pipes 72, 74, and two outlet pipes 76, 78. The two inlet pipes 72, 74 and the two outlet pipes 76, 78 are in flow communication with the gas decelerator chamber 70. The two inlet pipes 72, 74 receive the pulses of exhaust gas from the plurality of muffler inlets 56, 58. In an alternate embodiment, the two gas inlet pipes 72, 74 and the two gas outlet pipes 76, 78 are integral with gas decelerator chamber 70. In this embodiment, the length of the gas decelerator chamber 70 is extended so as to include the length of the gas inlet and outlet pipes shown in FIG. 4. Thus, the extended gas decelerator chamber 70 alone forms the diverter subassembly 64.

Figure 5B:
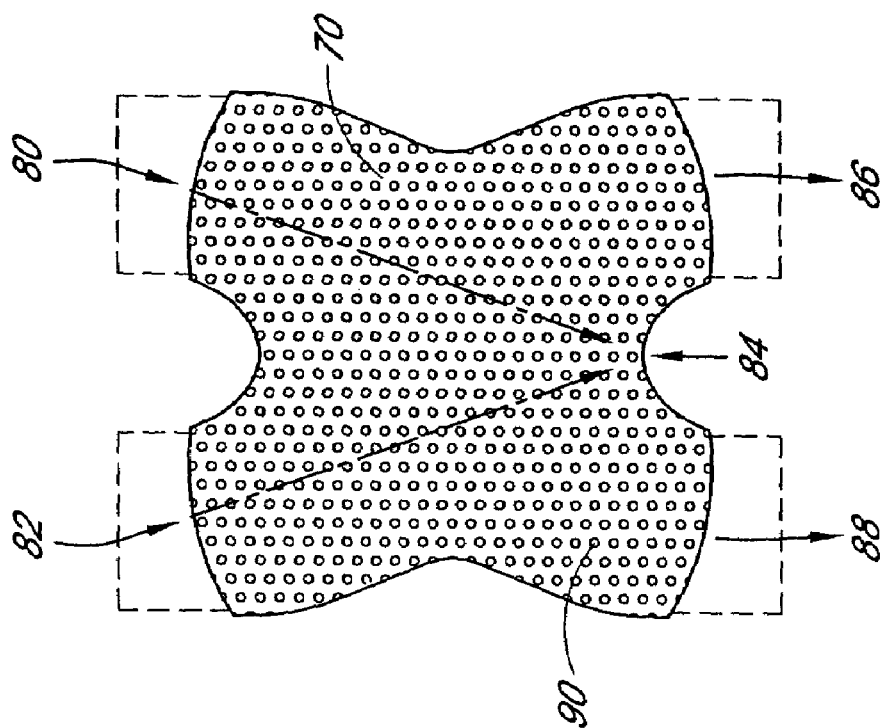
FIG. 5B is a bottom perspective view of the gas decelerator chamber that is a component of the diverter subassembly shown in FIG. 4.
Figure 5A:
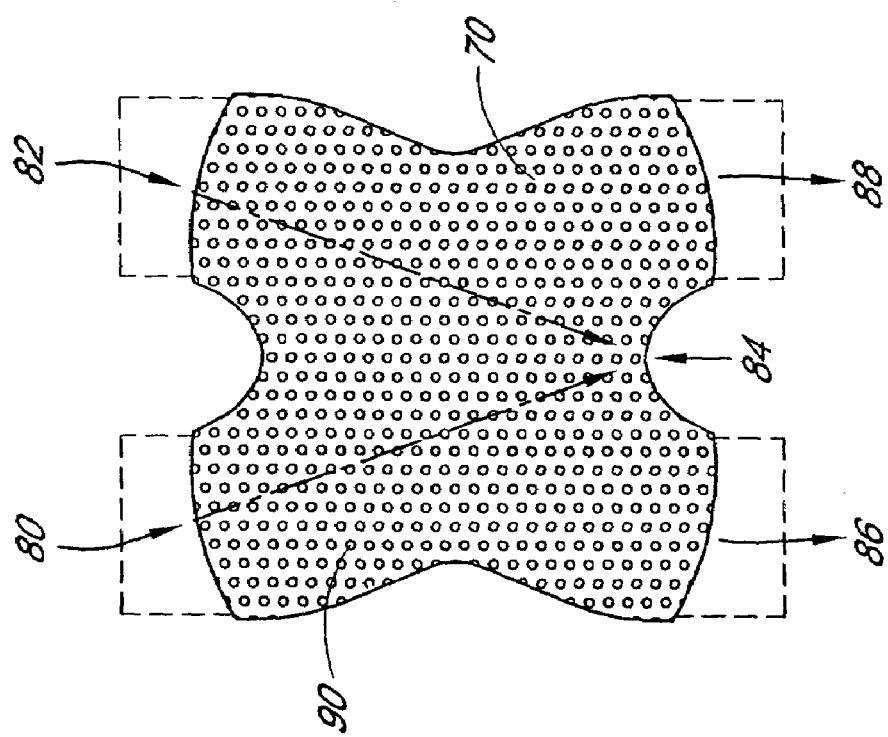
FIG. 5A is a top perspective view of a gas decelerator chamber that is a component of the diverter subassembly shown in FIG. 4.

Now referring to FIGS. 5A-5B, which are top and bottom perspective views of the gas decelerator chamber 70, respectively, a component of the diverter subassembly 64 from FIG.

4 is shown. Exhaust inlet 82 is in flow communication with inlet pipe 72; and exhaust inlet 80 is in flow communication with inlet pipe 74. The exhaust inlets 80, 82 are aligned to direct the pulse of exhaust gas travelling from the two gas inlet pipes 72, 74 onto a flow splitter 84 which may be integral to the gas decelerator chamber 70. The exhaust inlets 80, 82 form an acute angle so that each of the two gas inlet pipes 72, 74 are in line with the flow splitter 84. The outer surface of the flow splitter 84 is primarily concave with the inner surface being primarily convex. The flow splitter 84 is located obliquely to the flow direction of the pulse of exhaust gas to divide each pulse of exhaust gas between two exhaust outlets 86, 88. The two exhaust outlets 86, 88 direct each distributed pulse of exhaust gas away from the flow splitter 84 forming a low-pressure zone (not shown) in the wake of the pulse of exhaust gas. The low-pressure zone preferentially travels back up the exhaust system components towards the plurality of exhaust ports 34 to scavenge the subsequent pulse of exhaust gas.

Still referring to FIGS. 5A-5B, one advantageous embodiment of the gas decelerator chamber 70 is provided with an array of perforations 90 extending therethrough. It is to be understood, however, that louvers, slots, or other substantially equivalent communication means can be provided in place of the perforations 90 to enable expansion of the exhaust gas in the gas decelerator chamber 70 into the sound-absorbing material between the decelerator chamber 70 and the external housing 54. In an alternate embodiment shown in FIG. 8, the perforations 90 extend along the entire diverter subassembly 64. Furthermore, in alternate embodiments, the size of the perforations 90 can be varied along the surface of the gas decelerator chamber 70.

In one embodiment of the invention, the gas decelerator chamber 70 is fabricated by welding two perforated upper and lower halves 90 together. In an alternate embodiment, the perforations are added once the gas decelerator chamber 70 is formed.

Returning to FIGS. 3, 4, and 5A-5B, the two exhaust outlets 86, 88 are in flow communication with the cores 66, 68 via the two gas outlet pipes 76, 78. As shown more clearly in FIG. 6, an embodiment of the cores 66, 68 have a cylindrical shape, although the illustrated circular cross-section is not essential, and non-circular cross-sections may be preferred in some embodiments. Formed in the cores 66, 68 is an array of stamped, cup-shaped perforations 94. It is to be understood, however, that louvers, slots, holes, or other substantially equivalent communication means can be provided in place of the perforations 94. For example, the perforations 94 can be rectangular, cup-shaped, or hexagonal. Moreover, the perforations 94 can extend for the entire length or for one or more portions of the cores 66, 68. Furthermore, in alternate embodiments, the size of the perforations 94 can be varied along the length of the cores 66, 68.

Figure 6:
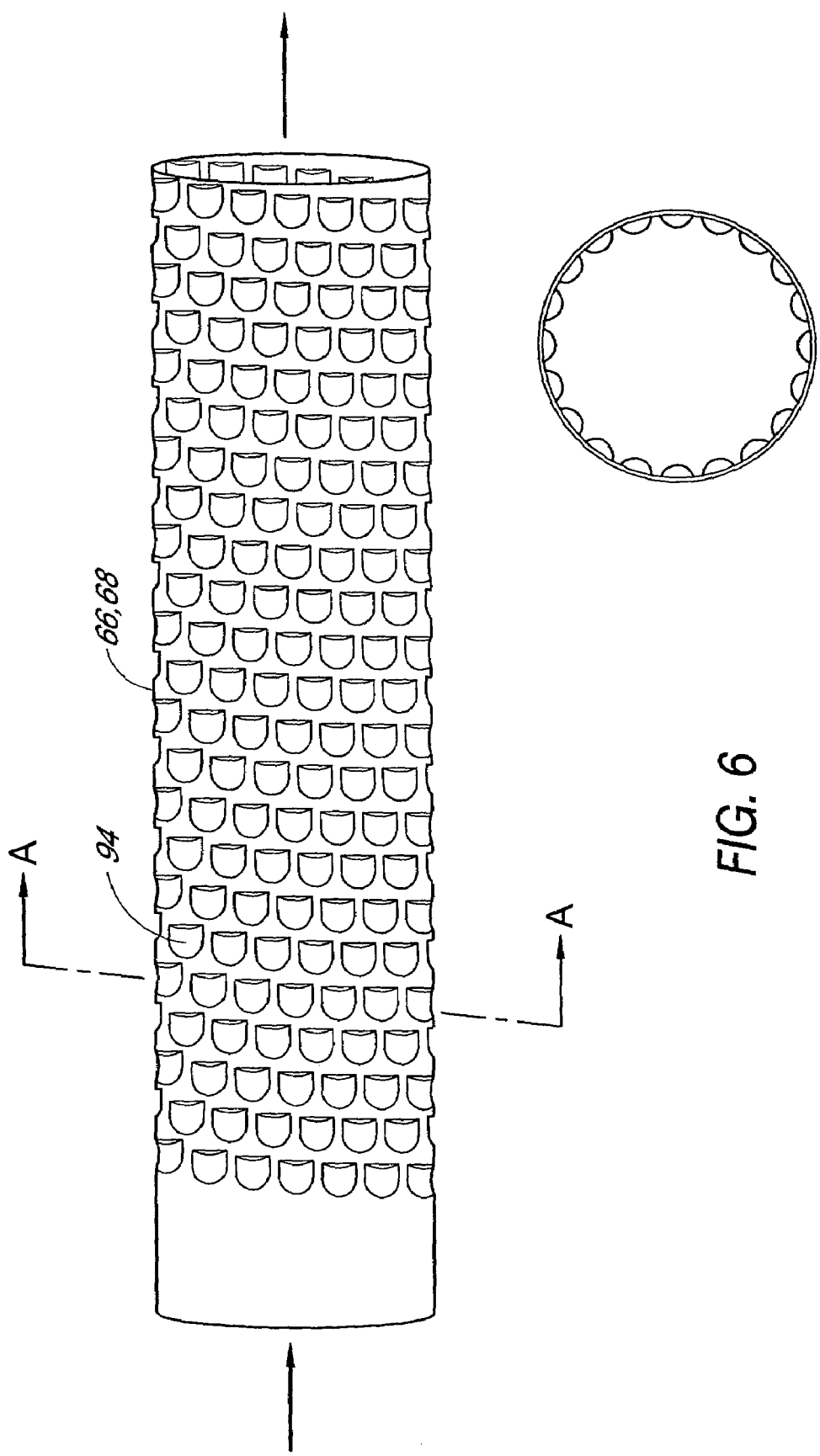
FIG. 6 is a top perspective view of one embodiment of a core that is a component of the muffler assembly shown in FIG. 3.
Figure 7:
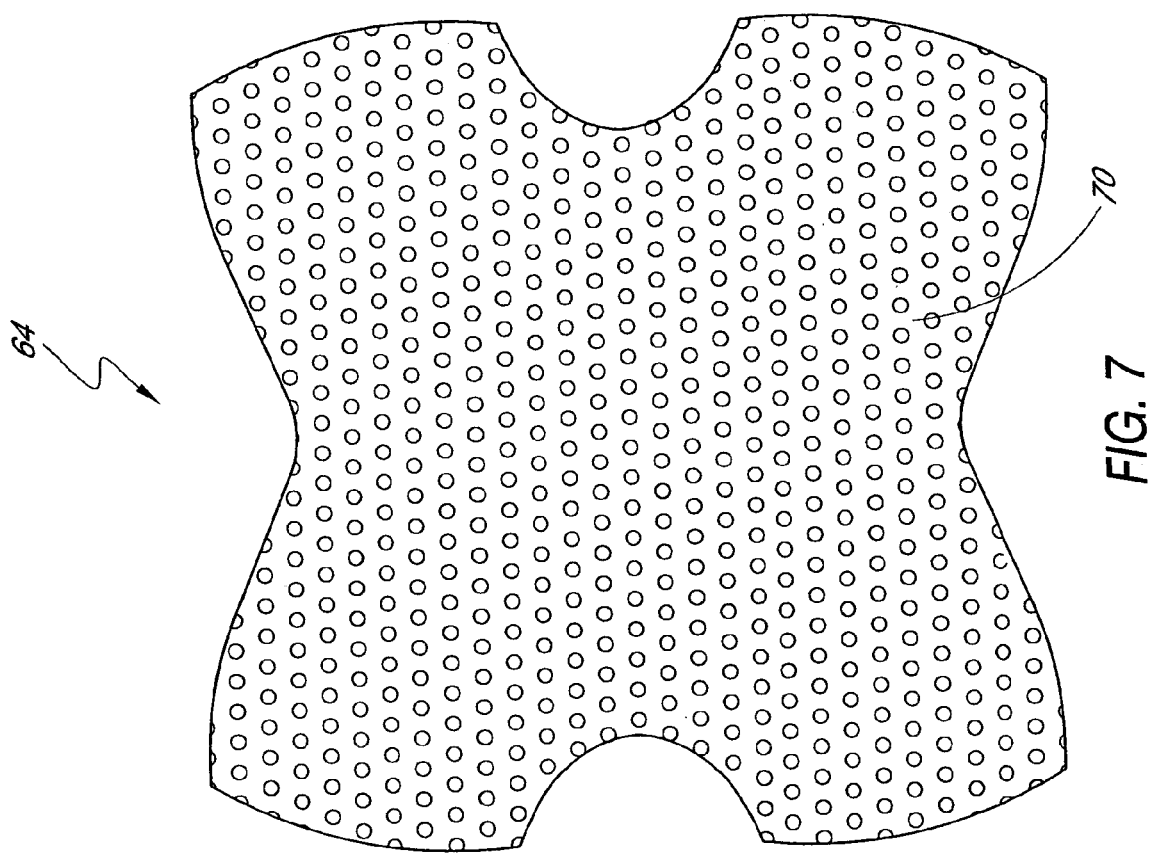
FIG. 7 is a top perspective view of an alternate embodiment of the diverter subassembly that is a component of the muffler assembly shown in FIG. 3.

In one embodiment, each perforation has an arcuate concave outer surface formed by lancing the core 66, 68 and forcing a section thereof inwardly within the interior of the core 66, 68. In this embodiment, the resulting perforation has a cup-shape with one end of the cup-shaped perforation open and one end closed (FIG. 6, Section A-A). The cup-shaped perforations 94 are preferably formed in a series of helical rows extending along the full length of the core 66, 68 with the closed ends of the cup-shaped perforations 94 facing in the same direction such that the bisected pulse of exhaust gas from the diverter subassembly 64 first engages the closed ends of each cup-shaped perforation 94. The cup-shaped perforations 94 create a swirling turbulence that reflects the exhaust sounds around within the cores 66, 68 thereby further attenuating and dissipating the sound waves.

Now referring again to FIG. 3, while the bisected pulse of exhaust gas passes through the cores 66, 68 it also passes over the cup-shaped perforations 94. To enhance sound attenuation, a sound deadening material 69, such as layers of glass, composite, or steel wool material, may be added around the cores 66, 68 and inside the space formed between the first and second baffle plates 65, 67 and the external housing 54. The sound deadening material may be wrapped around both cores 66, 68 or around each individual core 66, 68.

Figure 11:
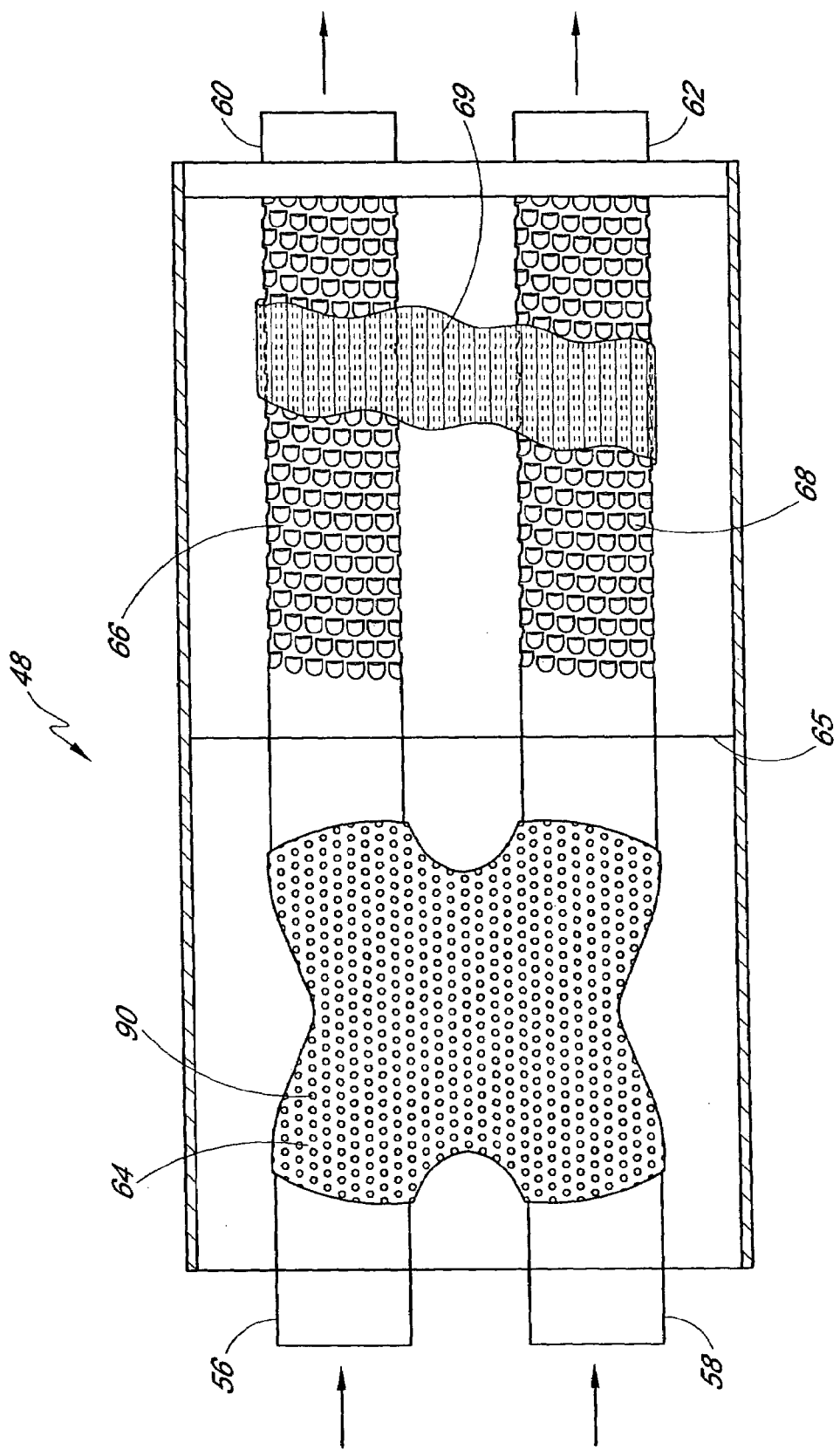
FIG. 11 is a cut-away top perspective view of an alternate embodiment of the invention, wherein the cores extend to the end of the muffler assembly.

Still referring to FIG. 3, once the bisected pulse of exhaust gas exits the cores 66, 68, the exhaust gas enters the dead air space chamber 63. The dead air space chamber 63 allows the bisected pulse of exhaust gas to recombine prior to being expelled to the atmosphere. In an alternate embodiment shown in FIG. 11, the dead air space chamber 63 and the second baffle plate 67 are omitted, and the cores 66, 68 extend to the exhaust outlets 60, 62.

Engine performance tests were completed on a Ford SVT Cobra R® using the exhaust system 18 constructed in accordance with one embodiment of this invention. Dynamometer results demonstrated an increase in maximum horsepower from 359.5 @ 77.0 MPH to 375.6 @ 80.0 MPH. The increase in performance caused by the muffler assembly 48 translates into more roll-on power, which increases the user's ability to pass traffic at highway speeds and increase fuel economy. In addition, incorporation of the muffler assembly 48 overcomes the Ford SVT Cobra R® engine's lack of a strong, throaty rumble being emitted from its stock exhaust system. Dynamometer tests were also performed on a Toyota Tundra® truck with the muffler assembly 48 installed. These tests measured an increase in maximum horsepower from 224 to 240. It will be appreciated that the vehicles that would benefit from incorporating the muffler assembly 48 into their exhaust systems are not limited to the vehicles described above.

In one embodiment of the invention, as illustrated in FIG. 1, the automobile 16 is shown with the muffler assembly 48 incorporated into an original equipment manufacturer (OEM) exhaust system. A feature of this preferred embodiment is that most of the components of the OEM exhaust system (not shown) are retained so as to maintain the integrity of the OEM exhaust system. The installation of the muffler assembly 48 merely requires the removal of the OEM muffler (not shown) which does not require any permanent modification to the automobile 16.

Figure 8:
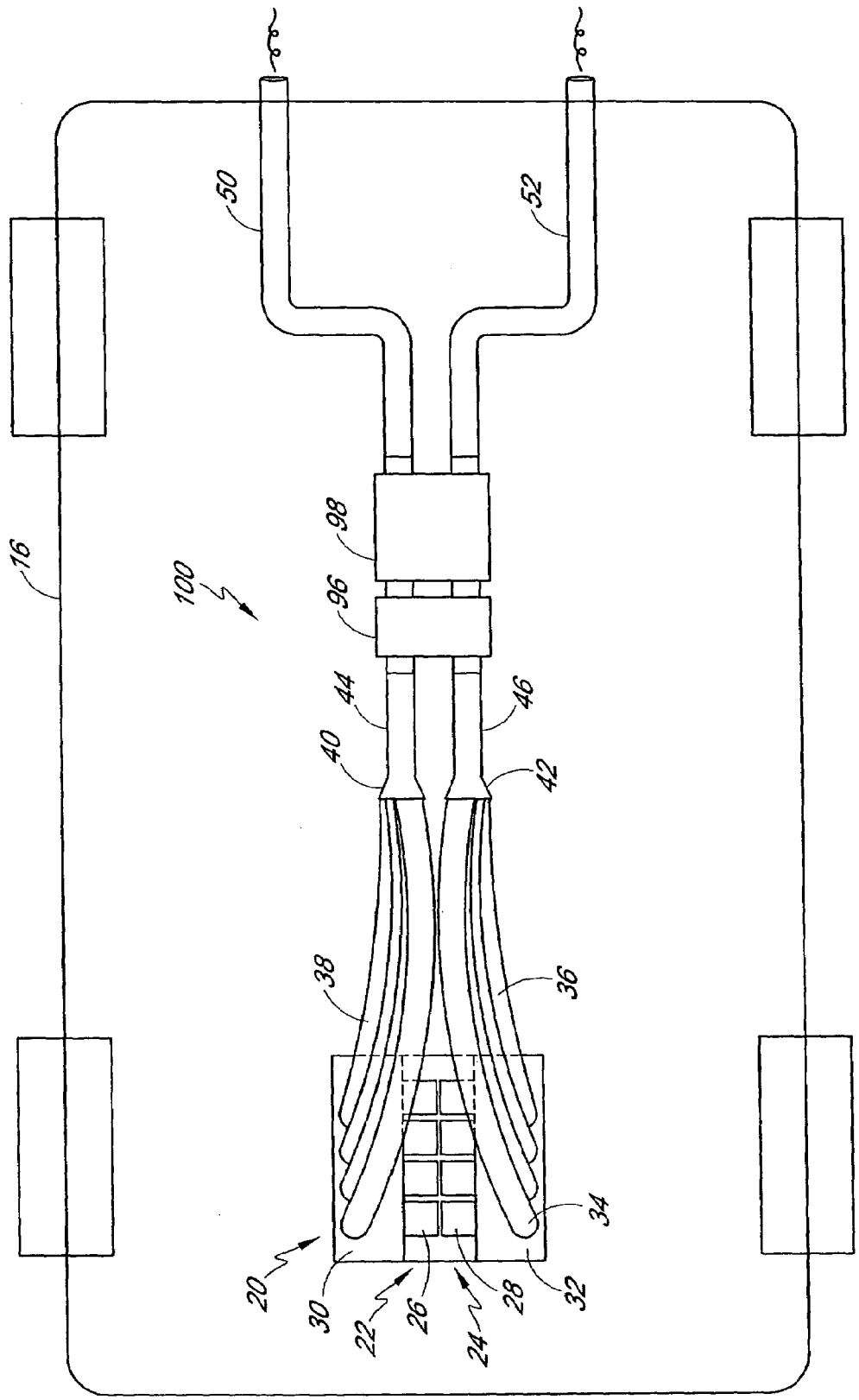
FIG. 8 is a bottom plan view showing an exhaust system according to an alternate embodiment of the invention.
Figure 9:
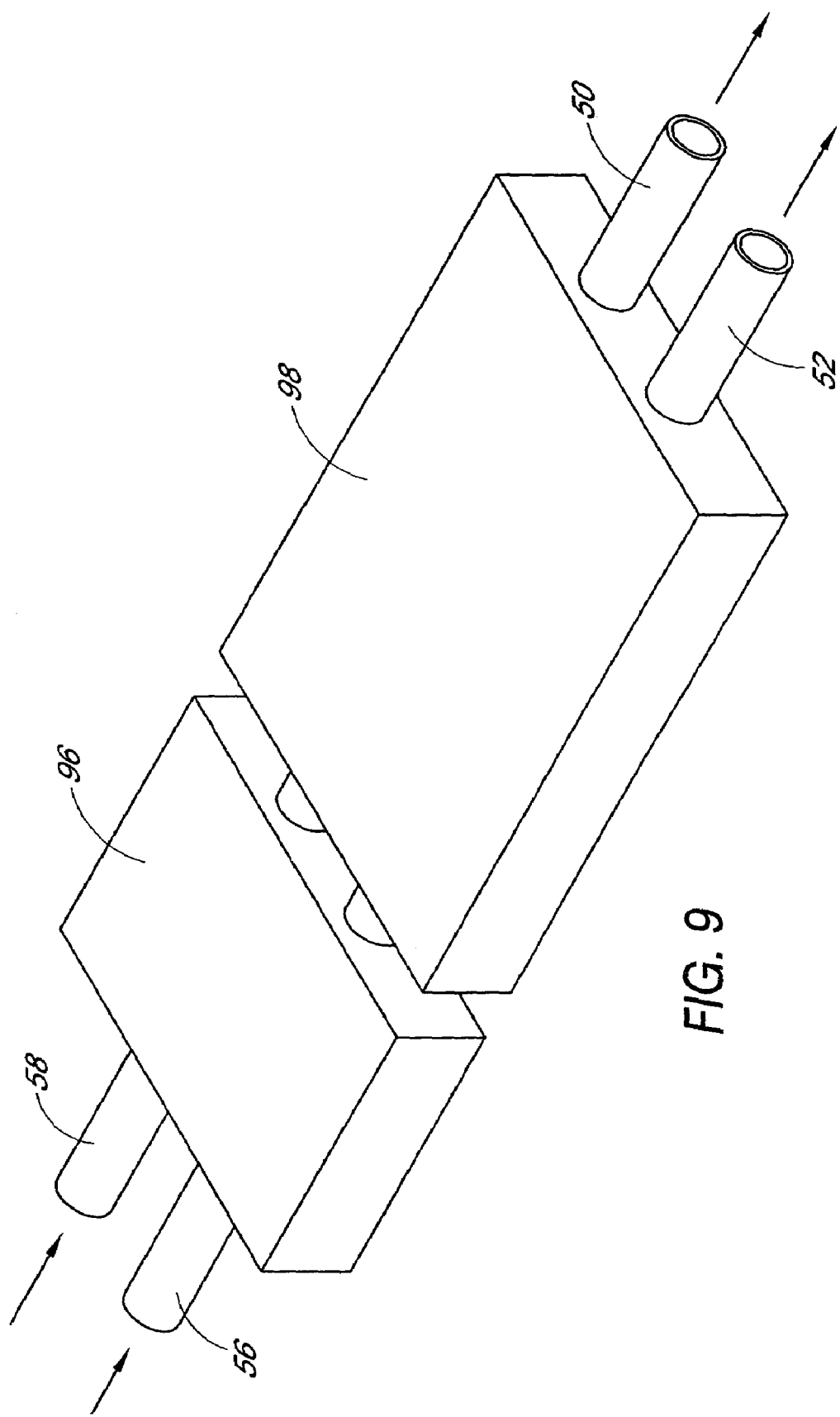
FIG. 9 is a top perspective view of a resonator and an OEM muffler from the exhaust system shown in FIG. 8.

An alternate embodiment of the exhaust system according to the invention is shown in FIGS. 8 and 9. This embodiment illustrates a resonator 96 added to an OEM exhaust system 100 without removing an OEM muffler 98. A resonator in an exhaust system will further attenuate the exhaust noise. Often resonators are similar to the straight through muffler except they usually incorporate insulating material. Resonators can be located forward or aft of the muffler in the exhaust system. One resonator design is called a Helmholtz resonator. A Helmholtz resonator is similar to a straight through muffler without any insulating material since it depends on reflecting to cancel the sound waves.

Figure 10:
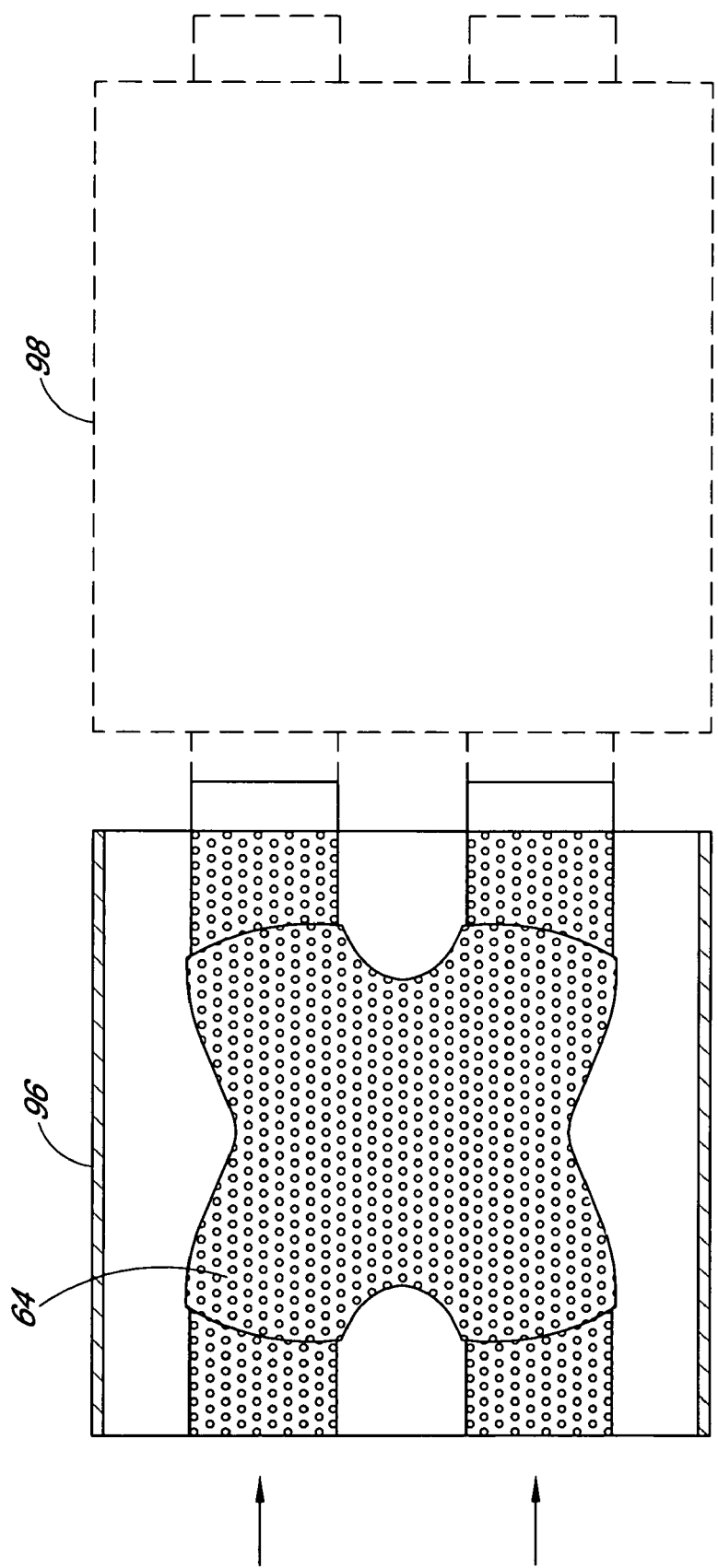
FIG. 10 is a top perspective view of a diverter subassembly that is a component of the resonator shown in FIG. 9.

The resonator 96 is incorporated into the exhaust system 100 upstream of the OEM muffler 98. As shown in FIG. 10, the resonator 96 includes a diverter subassembly 64 as described above. In this embodiment, after the pulse of exhaust gas passes through the diverter subassembly 64, it exits the resonator 96 where it re-enters the OEM exhaust system upstream of the OEM muffler 98.

The embodiments described herein provide sufficient sound attenuation of the exhaust gases while increasing the engine's performance characteristics. Furthermore, the muffler designs modify the tonal qualities of the exhaust sound so as to be pleasing to the user. This design is also easily incorporated into an OEM exhaust system.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. A muffler for receiving alternating pulses of exhaust gas from a multi-cylinder engine comprising:
    a housing enclosing means for muffling the sound of exhaust passing therethrough; and
    a chamber located within a first portion of the housing and having first and second exhaust inlets and a decelerator chamber, said first and second exhaust inlets being aligned so as to divide alternating pulses of exhaust gas received from the first and second exhaust inlets into two substantially equal portions between first and second exhaust outlets, the decelerator chamber having a width at least as great as a combined width of the first and second exhaust inlets.

2. The muffler of claim 1, wherein the chamber is positioned upstream of the muffling means.

3. The muffler of claim 1, wherein the chamber comprises a plurality of perforations in a wall of said chamber, said perforations permitting flow of some of the exhaust gases directed into the chamber to flow in a portion of the housing.

4. The muffler of claim 3, wherein the perforations are positioned over a substantial portion of the wall of the chamber.

5. The muffler of claim 1, wherein the muffling means comprises a first and second core in fluid communication with the chamber and positioned within a second portion of the housing, said cores configured to cause exhaust gas passing therethrough to swirl.

6. The muffler of claim 5, wherein each core comprises a plurality of perforations.

7. The muffler of claim 6, wherein the second portion of the housing further encloses sound absorbing material surrounding at least a portion of the cores.

8. The muffler of claim 5, further comprising a first plate within the housing and configured to fluidly isolate substantially the first portion from the second portion of the housing.

9. The muffler of claim 5, further comprising a third portion of the housing substantially downstream from the cores, said third portion configured to permit exhaust gas passing thought the cores to recombine.

10. The muffler of claim 9, further comprising a second plate within the housing and configured to fluidly isolate substantially the second portion from the third portion of the housing.

11. An exhaust system of a multi-cylinder engine, the system comprising:
    an engine configured to generate exhaust gases and direct them into first and second manifolds, said engine further configured to operate so as to discharge alternating pulses of exhaust gas to the first and second manifolds; and
    a muffler comprising a housing for enclosing a chamber having first and second inlets, a central region, and first and second outlets, said first and second inlets being aligned so as to divide exhaust gas entering the chamber from one of the inlets into two substantially equal portions between the outlets, the central region having a width at least as great as a combined width of the first and second inlets.

12. The exhaust system of claim 11, wherein the chamber comprises perforations.

13. The exhaust system of claim 11, wherein the muffler further comprises first and second cores in fluid communication with the first and second outlets, respectively, each core comprising perforations configured to swirl the exhaust gas as it travels through each core.

14. A method of processing exhaust gases from a multi-cylinder engine, wherein a pulse of exhaust gas is produced in a cylinder of the multi-cylinder engine and processed by a muffler, the method comprising:
    routing the pulse of exhaust gas in a flow path from the cylinder to one of two exhaust inlets of the muffler, wherein the two exhaust inlets alternate in their collection of subsequent discharges of the pulse of exhaust gas and together define a first width;
    expanding the collected pulse of exhaust gas in a decelerator chamber, wherein the decelerator chamber has a width at least as great as the first width;
    dividing the expanded pulse of exhaust gas into two substantially equal portions of exhaust gas with a perforated flow splitter; and
    expelling both portions of exhaust gas from the muffler and into the atmosphere.

15. The method of claim 14, further comprising swirling both portions of exhaust gas.

16. A muffler comprising a housing configured to receive alternating pulses of exhaust gas from an engine, said muffler further comprising a plurality of openings into the muffler, a decelerator chamber, and a perforated flow splitter, the decelerator chamber having a width at least as great as a combined width of the plurality of openings, the perforated flow splitter being mounted inside the housing and configured to split each pulse of exhaust gas into two substantially equal portions, said muffler further comprising means for expelling the split pulse of exhaust gas into the atmosphere.

17. An automotive vehicle comprising:
    a chassis;
    a multi-cylinder engine within at least a portion of the chassis and comprising two cylinder heads, each head comprising at least one cylinder; and
    a muffler comprising a gas decelerator chamber comprising two inlets, the decelerator chamber having a width at least as great as a combined width of the two inlets, each inlet fluidly connected to at least one of the cylinders, the two inlets being aligned so as to direct alternating pulses of exhaust gas against a flow splitter, said flow splitter configured to divide the alternating pulses of exhaust gas into two substantially equal portions between a first exhaust outlet and a second exhaust outlet.

18. A method of manufacturing a muffler for a multi-cylinder engine, the method comprising:
    connecting a diverter subassembly to a plurality of cores, wherein the diverter subassembly is substantially perforated and has two inlet pipes and two outlet pipes, wherein each inlet pipe is aligned to direct a pulse of exhaust gas onto a flow splitter, wherein the flow splitter is located obliquely to the flow direction of the pulse of exhaust gas and divides the pulse of exhaust gas into two substantially equal portions between the two outlet pipes, wherein the two outlet pipes direct the divided pulse of exhaust gas away from the flow splitter and into the plurality of cores, wherein the plurality of cores has perforations, the perforations being disposed so as to swirl the divided pulse of exhaust gas;

connecting the plurality of cores to a dead air space chamber, wherein the dead air space chamber forms a common manifold for the divided pulse of exhaust gas; and installing the gas decelerator chamber, the plurality of cores, and the dead air space chamber within a muffler housing.

19. The method of manufacturing a muffler of claim 18, further comprising inserting a baffle plate between the diverter subassembly and the plurality of cores, wherein the baffle plate substantially isolates a first chamber formed between the muffler housing and the diverter subassembly from a second chamber formed between the muffler housing and the plurality of cores.

20. A resonator configured to connect with an original equipment manufacturer (OEM) exhaust system and thereby attenuate exhaust noise, the resonator comprising:

a housing, wherein the housing connects upstream of an OEM muffler; and a diverter subassembly located substantially within the housing, wherein the diverter subassembly comprises:

a first inlet pipe and a second inlet pipe connected to and in flow communication with the OEM exhaust system;

a gas decelerator chamber connected to and in flow communication with the first and second inlet pipes, the gas decelerator chamber having a width at least as great as a combined width of the first and second inlet pipes, wherein the alignment of the first and second inlet pipes directs the pulse of exhaust gas onto a flow splitter in the gas decelerator chamber, wherein the flow splitter is located obliquely to the flow direction of the pulse of exhaust gas and divides the pulse of exhaust gas into two substantially equal portions, and wherein the flow splitter has a rounded convex shape and is formed by an inner surface of the gas decelerator chamber; and a first outlet pipe and a second outlet pipe connected to and in flow communication with The gas decelerator chamber, wherein the two outlet pipes direct the divided pulse of exhaust gas away from the flow splitter and to the OEM muffler.

21. The resonator of claim 20, wherein at least a portion of a surface of the gas decelerator chamber comprises perforations that allow the pulse of exhaust gas to also flow through the surface and into the housing.

* * * * *

UNITED STATES PATENT AND TRADEMARK OFFICE
CERTIFICATE OF CORRECTION

PATENT NO. : 7,426,980 B2 Page 1 of 1
APPLICATION NO. : 10/919624
DATED : September 23, 2008
INVENTOR(S) : Darryl C. Bassani It is certified that error appears in the above-identified patent and that said Letters Patent is hereby corrected as shown below:

In Col. 9, Line 52, in Claim 9, please change "thought" to --through--.

In Col. 12, Line 16 (approx.), in Claim 20, please change "The" to --the--.

Signed and Sealed this

Eighteenth Day of August, 2009

David J. Kappos
*Director of the United States Patent and Trademark Office*